US012766912B2

(12) United States Patent
Kang et al.

(10) Patent No.: US 12,766,912 B2
(45) Date of Patent: Oct. 20, 2026

(54) FLUID-CONTROLLING VALVE ASSEMBLY

(71) Applicant: HANON SYSTEMS, Daejeon (KR)

(72) Inventors: In Jae Kang, Daejeon (KR); Tae Yong Park, Daejeon (KR); Jae Chun Ryu, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 124 days.

(21) Appl. No.: 18/855,960

(22) PCT Filed: Aug. 25, 2023

(86) PCT No.: PCT/KR2023/012641

§ 371 (c)(1),
(2) Date: Oct. 10, 2024

(87) PCT Pub. No.: WO2024/135992

PCT Pub. Date: Jun. 27, 2024

(65) Prior Publication Data

US 2025/0229594 A1 Jul. 17, 2025

(30) Foreign Application Priority Data

Dec. 22, 2022 (KR) ........................ 10-2022-0181299

(51) Int. Cl.
*B60H 1/00* (2006.01)

(52) U.S. Cl.
CPC ..... *B60H 1/00485* (2013.01); *B60H 1/00885* (2013.01)

(58) Field of Classification Search
CPC ..... Y10T 137/86533; Y10T 137/86566; Y10T 137/86646; Y10T 137/86654; B60H 1/00485; B60H 1/00885; F01P 7/00; F16K 11/0856; F16K 31/041
See application file for complete search history.

(56) References Cited

U.S. PATENT DOCUMENTS

2004/0140445 A1* 7/2004 Pervaiz ................. F16K 5/0478 251/174
2004/0154671 A1* 8/2004 Martins .............. B60H 1/00485 137/625.47
2004/0238159 A1* 12/2004 Humburg ................. B60H 1/08 165/41
2006/0118066 A1* 6/2006 Martins ............... F16K 11/0856 123/41.08

(Continued)

FOREIGN PATENT DOCUMENTS

DE 10-2021-205883 A1 5/2022
FR 2988459 A1 * 9/2013 .......... F16K 11/0856

(Continued)

OTHER PUBLICATIONS

Translation of KR102276255 retrieved from espacenet.com. (Year: 2026).*

*Primary Examiner* — Jessica Cahill
(74) *Attorney, Agent, or Firm* — Bridgeway IP Law Group, PLLC; Jihun Kim

(57) ABSTRACT

A fluid-controlling valve assembly according to an embodiment includes a housing and a rotor installed inside the housing to be rotatable in accordance with air-conditioning modes, and the rotor is stacked in two stages along the axial direction such that fluid channels enabling fluid to flow may be formed in each of the first stage and the second stage.

18 Claims, 8 Drawing Sheets

30: 31, 32, 33, 34

(56) References Cited

U.S. PATENT DOCUMENTS

| | | | | |
|---|---|---|---|---|
| 2022/0163132 | A1* | 5/2022 | Jeong | F16K 11/0856 |
| 2022/0316608 | A1* | 10/2022 | Tiemeyer | F16K 11/0856 |
| 2024/0133471 | A1* | 4/2024 | Hong | B60H 1/00278 |

FOREIGN PATENT DOCUMENTS

| | | | | | |
|---|---|---|---|---|---|
| GB | 915598 | A | * | 1/1963 | F25B 41/20 |
| GB | 2581160 | A | * | 8/2020 | F16K 11/0716 |
| JP | 2014-112031 | A | | 6/2014 | |
| JP | 2017-003035 | A | | 1/2017 | |
| KR | 10-2276255 | B1 | | 7/2021 | |
| KR | 10-2022-0045324 | A | | 4/2022 | |
| KR | 10-2022-0071316 | A | | 5/2022 | |
| WO | 2021/048095 | A1 | | 3/2021 | |

* cited by examiner

30: 31, 32, 33, 34

30: 31, 32, 33, 34

FLUID-CONTROLLING VALVE ASSEMBLY

TECHNICAL FIELD

The present invention relates to a fluid-controlling valve assembly, and more particularly, to a fluid-controlling valve assembly controlling a fluid for heat exchange with a heat exchanger in accordance with air-conditioning modes.

BACKGROUND ART

Amid the trend of eco-friendly industrial development and the search for energy sources to replace fossil fuels, no field in the automotive industry has drawn more attention than electric vehicles and hybrid vehicles in recent years. Electric vehicles and hybrid vehicles use batteries to power their operations, and batteries are used not only for driving but also for heating and cooling.

The fact that batteries are used as a heat source for heating and cooling in vehicles that use batteries to power their operations means that the driving distance is reduced, and to overcome this problem, a method of applying a thermal management system widely used in household heating and cooling appliances to automobiles has been proposed.

It is to be noted that a thermal management system (heat pump system) refers to absorbing heat at a low temperature and transferring the absorbed heat to a high temperature. For example, a thermal management system has a cycle in which a liquid refrigerant evaporates inside an evaporator, takes heat from the surroundings to become a gas, and then releases heat to the surroundings by a condenser to liquefy. When applied to electric vehicles or hybrid vehicles, this has the advantage of securing a heat source lacking in a conventional air-conditioning system.

A vapor injection system may be used to enhance heating, cooling, and dehumidification performance in such thermal management systems. Here, the vapor injection system uses a gas-liquid separator in the refrigerant circulation system for heating and cooling to feed gaseous refrigerant back into the compressor and supply a liquid refrigerant to the evaporator or chiller.

A multi-valve assembly that distributes cold water and hot water to an integrated heat exchanger in accordance with the mode of the air-conditioning device (HVAC) is required to implement cooling, heating, and dehumidification modes with the heat exchanger used in these vapor injection systems. In particular, at least three 4-way valves were typically required to change coolant ports in accordance with the mode of the air-conditioning system. This increased the overall costs of valves and posed a significant disadvantage in packaging.

DISCLOSURE

Technical Problem

One embodiment of the present invention provides a fluid-controlling valve assembly that may control a heat exchanger in accordance with the air-conditioning mode using a single-valve assembly by forming channels in a rotor and configuring a plurality of ports communicating with the channels in a housing, thereby reducing costs and offering an advantage in packaging.

One embodiment of the present invention provides a fluid-controlling valve assembly that does not require a separate thermostatic door for air-conditioning mode control of a heat exchanger to implement cooling, heating, and dehumidification modes.

Issues that the present invention intends to address are not limited to the issues mentioned above, and other issues not mentioned herein will be clearly understood by those skilled in the art from the following description.

Technical Solution

A fluid-controlling valve assembly according to an embodiment of the present invention may include a housing; and a rotor installed inside the housing to be rotatable in accordance with the air-conditioning mode, wherein the rotor is stacked in two stages along the axial direction such that fluid channel enabling fluid to flow may be formed in a first stage and a second stage thereof respectively.

The fluid entering and exiting the integrated heat exchanger having a first heat exchanger portion and a second heat exchanger portion may be controlled, but the housing may be provided with a high-temperature fluid port through which high-temperature fluid enters and exits, a low-temperature fluid port through which low-temperature fluid enters and exits, and a plurality of fluid connection ports connected to the first heat exchanger portion and the second heat exchanger portion for fluid flow, and the fluid channels may selectively communicate with the high-temperature fluid port, low-temperature fluid port, and fluid connection ports according to rotation.

The high-temperature fluid port may include a first entry port through which the high-temperature fluid enters and a first exit port through which the high-temperature fluid exits, and the low-temperature fluid port may include a second entry port through which the low-temperature fluid enters and a second exit port through which the low-temperature fluid exits.

The fluid connection port may include a first connection port connected to the first outlet port of the first heat exchanger portion, a second connection port connected to the first inlet port of the first heat exchanger portion, a third connection port connected to the second outlet port of the second heat exchanger portion, and a fourth connection port connected to the second inlet port of the second heat exchanger portion.

The rotor may be formed in a cylindrical shape and be stacked in two stages along the axial direction.

The high-temperature fluid port may be disposed in the first stage of the rotor, and the low-temperature fluid port may be disposed in the second stage of the rotor.

The fluid connection port may further include a transport port for transporting fluid from one stage to the other stage of the rotor.

The transport port may be a pipe connecting the first stage and the second stage sides of the rotor on the outer surface of the housing.

A 1-1 channel, a 1-2 channel forming a flow path to cross the 1-1 channel, and a 1-3 channel forming a flow path to cross the 1-1 channel may be formed in the first stage of the rotor, and a 2-1 channel, a 2-2 channel forming a flow path to cross the 2-1 channel, and a 2-3 channel forming a flow path to cross the 2-1 channel may be formed in the second stage of the rotor.

The 2-1 channel, 2-2 channel, and 2-3 channel may be formed in a shape obtained by rotating the 1-1 channel, 1-2 channel, and 1-3 channel around the center of the rotor.

The 1-1 channel may be formed inside a first tube passing through the outer circumferential surface of the rotor, and the 2-1 channel may be formed inside a second tube passing through the outer circumferential surface of the rotor.

The 1-2 channel and 1-3 channel may be formed to cross the 1-1 channel perpendicularly along the outside of the space that the first tube passes through, and the 2-2 channel and 2-3 channel may be formed to cross the 2-1 channel perpendicularly along the outside of the space that the second tube passes through.

The 1-2 channel and 1-3 channel may form a flow path in a curved shape with both ends in the shape of an elongated hole, and the 2-2 channel and 2-3 channel may form a flow path in a curved shape with both ends in the shape of an elongated hole.

During cooling mode, the low-temperature fluid may enter the second entry port and enter the second inlet port through the fourth connection port to exchange heat with the air in the second heat exchanger portion, and the fluid exiting the second outlet port may enter the third connection port to exit the second connection port and enter the first inlet port to exchange heat with the air in the first heat exchanger portion.

The fluid exiting the first outlet port may enter the first connection port, pass through the 2-2 channel, and then enter the 1-1 channel through the transport port, and the fluid exiting the 1-1 channel may enter the 2-3 channel through the transport port and then exit the second exit port.

During heating mode, the high-temperature fluid may enter the first entry port and enter the first inlet port through the second connection port to exchange heat with the air in the first heat exchanger portion and the fluid exiting the first outlet port may enter the first connection port to exit the fourth connection port and enter the second inlet port to exchange heat with the air in the second heat exchanger portion.

The fluid exiting the second outlet port may enter the third connection port, pass through the 1-2 channel, and then enter the 2-1 channel through the transport port, and the fluid exiting the 2-1 channel may enter the 1-3 channel through the transport port and then exit the first exit port.

During dehumidification mode, the high-temperature fluid may enter the first entry port, pass the 1-3 channel, and then enter the 2-3 channel through the transport port, and the fluid entering the 2-3 channel may exit the fourth connection port to reheat the air in the second heat exchanger portion.

The fluid exiting the second outlet port may enter the third connection port, pass through the 1-1 channel, and then exit the first exit port.

The low-temperature fluid may enter the second entry port, pass through the 2-2 channel, and then enter the 1-2 channel through the transport port, and the fluid entering the 1-2 channel may exit the second connection port to remove humidity in the first heat exchanger portion.

The fluid exiting the first outlet port may enter the first connection port, pass through the 2-1 channel, and then exit the second exit port.

Advantageous Effects

According to an embodiment of the present invention, control of the heat exchanger in accordance with the mode using a single-valve assembly is made possible by configuring a plurality of ports forming channels in a rotor and communicating with channels in the housing, thereby reducing costs and having an advantage in packaging.

In addition, according to an embodiment of the present invention, a thermostatic door for mode control of the heat exchanger is not required to implement cooling, heating, and dehumidification modes.

MODE FOR INVENTION

Figure 1:
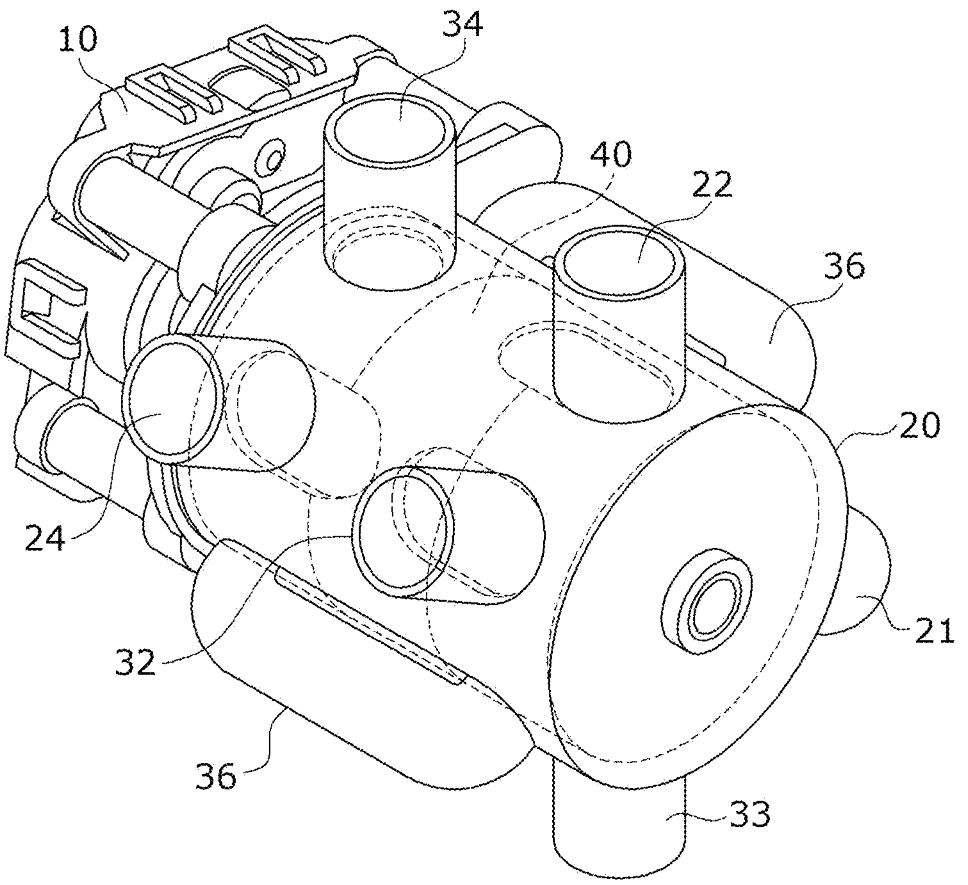
FIG. 1 is a perspective view illustrating the top of a fluid-controlling valve assembly according to an embodiment of the present invention.

The present invention may be subjected to various modifications and may have several embodiments, and specific embodiments will be illustrated in drawings and described in detail. However, this is not intended to limit the present invention to these particular embodiments, and it should be understood that all modifications, equivalents, and alternatives that fall within the scope of ideas and technology of the present invention are included. When it is determined that specific descriptions of related known technology may obscure the gist of the present invention in describing the present invention, its detailed description will be omitted.

The terms including ordinal numbers such as first, second, and the like may be used to describe various components, but the components are not to be limited by the terms. The terms may only be used for the purpose of distinguishing one component from another.

The terms used in the present application are used only to describe specific embodiments and are not intended to limit the present invention. Singular expressions include plural expressions unless the context explicitly indicates otherwise. In the present application, terms such as “comprise” or “have” are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

In addition, throughout the specification, “connected” does not mean only that two or more components are directly connected, but may also mean that two or more components are indirectly connected through another component, physically as well as electrically connected, or integrated even when referred to by different names depending on their position or functions.

Hereinafter, an embodiment of a fluid-controlling valve assembly according to the present invention will be described in detail with reference to the accompanying drawing. In describing with reference to the accompanying drawings, the same or corresponding components will be given the same reference numerals, and redundant descriptions will be omitted.

Figure 2:
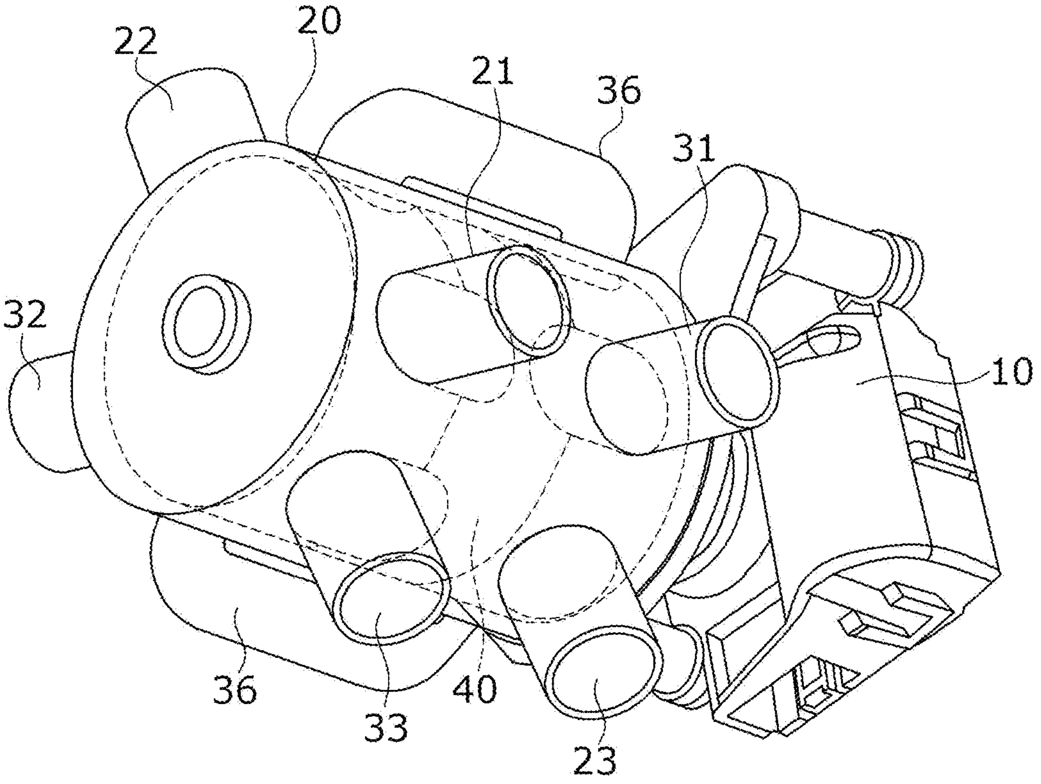
FIG. 2 is a perspective view illustrating the bottom of a fluid-controlling valve assembly according to an embodiment of the present invention.
Figure 3:
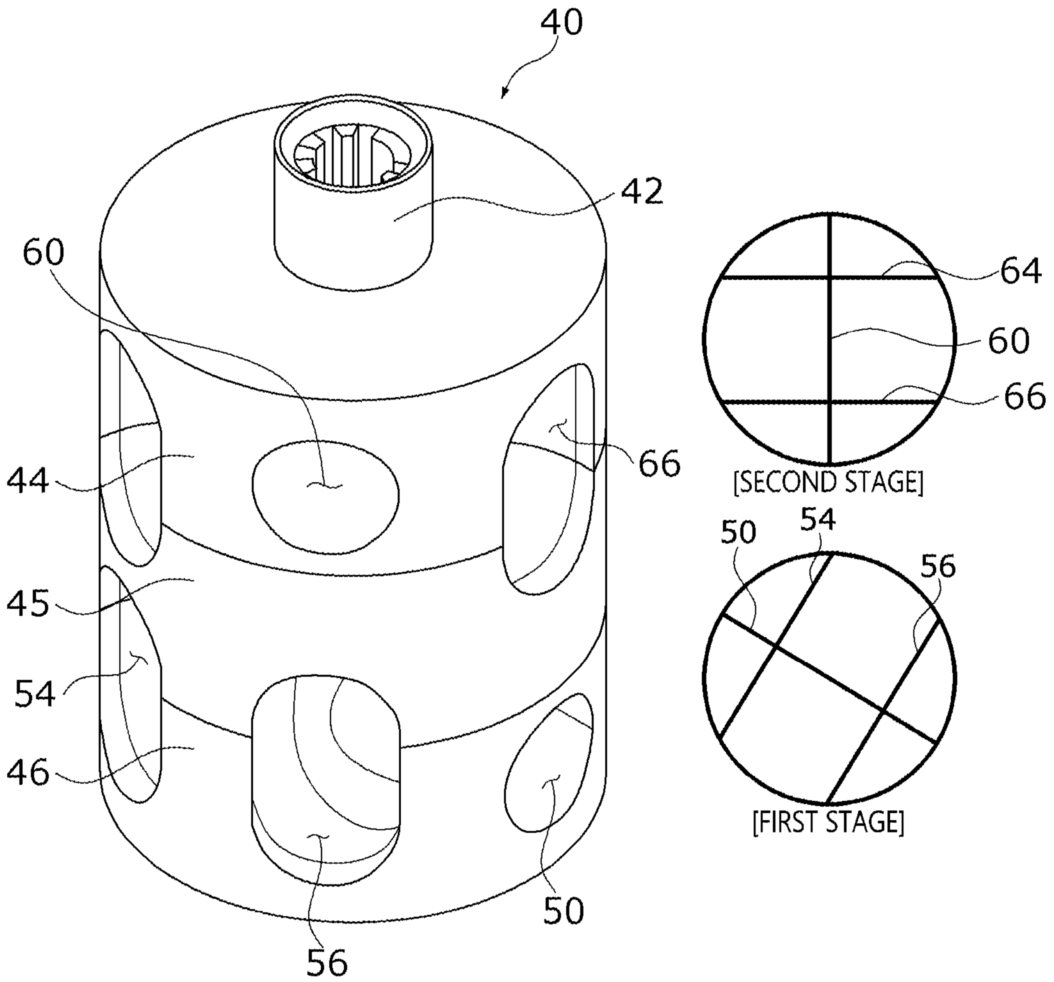
FIG. 3 is a perspective view illustrating a rotor of a fluid-controlling valve assembly according to an embodiment of the present invention.
Figure 4:
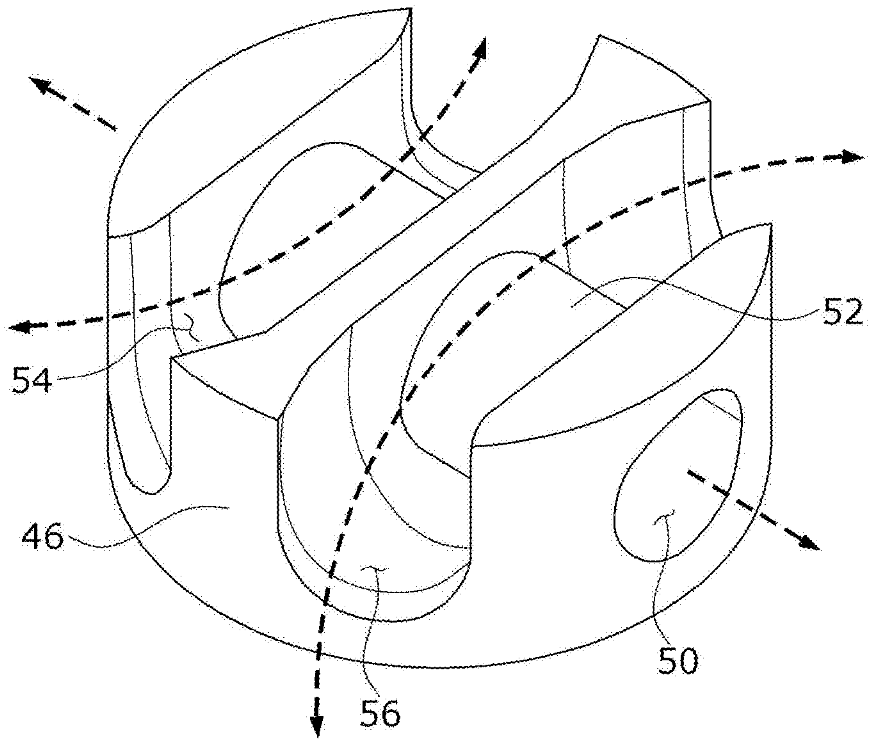
FIG. 4 is a perspective view illustrating a first rotor portion of a rotor.
Figure 5:
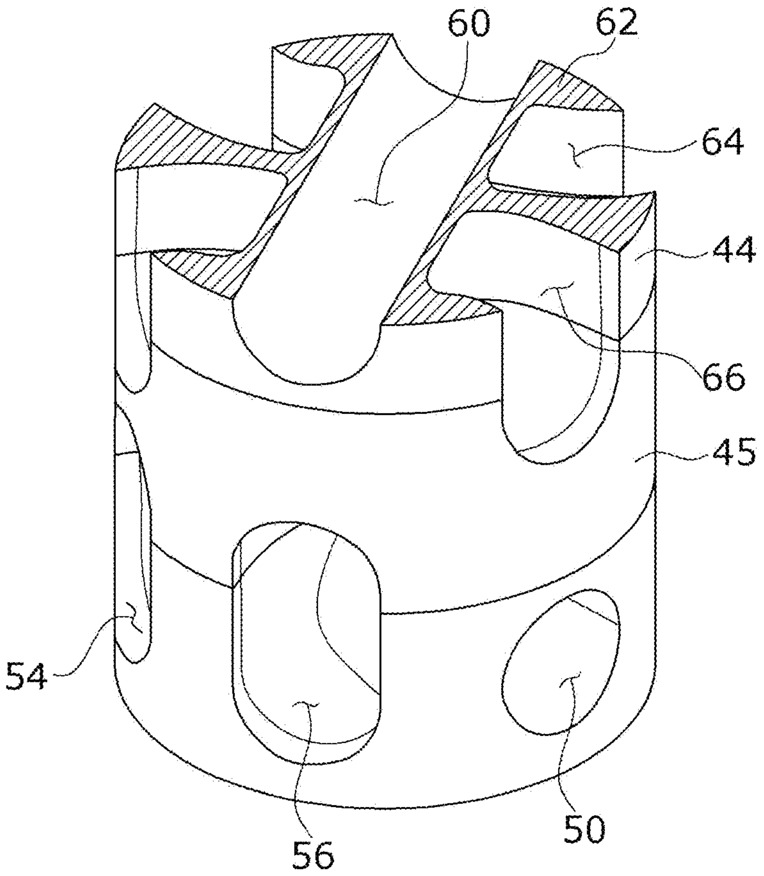
FIG. 5 is a perspective view illustrating a partially cut third rotor portion of a rotor.

FIG. 1 is a perspective view illustrating the top of a fluid-controlling valve assembly according to an embodiment of the present invention, FIG. 2 is a perspective view illustrating the bottom of a fluid-controlling valve assembly according to an embodiment of the present invention, FIG. 3 is a perspective view illustrating a rotor of a fluid-controlling valve assembly according to an embodiment of the present invention, FIG. 4 is a perspective view illustrating a first rotor portion of a rotor, and FIG. 5 is a perspective view illustrating a partially cut third rotor portion of a rotor.

As illustrated herein, a fluid-controlling valve assembly in an embodiment of the present invention controlling the fluid entering or exiting an integrated heat exchanger 100 having a first heat exchanger portion 110 and a second heat exchanger portion 120 may include a housing 20 and a rotor 40 installed inside the housing 20 to be rotatable in accordance with the air-conditioning modes. In the present embodiment, the fluid controlled by the valve assembly may be a coolant but is not limited thereto.

The housing 20 may be formed in a cylindrical shape having a predetermined volume to allow a rotor 40 to be rotatably installed inside. An actuator 10 serves as a power source installed in the axial direction of the housing 20 to transmit power to the rotor 40. The actuator 10 has a drive shaft (not shown) that extends in one direction and the drive shaft is coupled to a rotor shaft 42 to transmit power to the rotor 40.

The housing 20 may be provided with high-temperature fluid ports 21, 22 through which high-temperature fluid enters and exits, low-temperature fluid ports 23, 24 through which low-temperature fluid enters and exits, and a plurality of fluid connection ports 30 connected to a first heat exchanger portion 110 and a second heat exchanger portion 120 for fluid flow.

The high-temperature fluid ports 21, 22, the low-temperature fluid ports 23, 24, and the fluid connection ports 30 may each be formed in a short extending pipe shape to allow connection to pipes. The high-temperature fluid ports 21, 22, the low-temperature fluid ports 23, 24, and the fluid connection ports 30 may be formed to extend in directions substantially perpendicular to the outer surface of the housing 20 and communicate with a plurality of fluid channels formed in the rotor 40. In other words, the high-temperature fluid ports 21, 22, the low-temperature fluid ports 23, 24, and the fluid connection ports 30 may selectively communicate with the plurality of fluid channels according to the rotation of the rotor 40 to control the flow of the fluid.

The high-temperature fluid ports 21, 22 may include a first entry port 21 through which the high-temperature fluid enters and a first exit port 22 through which the high-temperature fluid exits. The first entry port 21 and the first exit port 22 may be positioned to form an obtuse angle with respect to the center of the housing. 20.

The low-temperature fluid ports 23, 24 may include a second entry port 23 through which the low-temperature fluid enters and a second exit port 24 through which the low-temperature fluid exits. The second entry port 23 and the second exit port 24 may be disposed to form an obtuse angle with respect to the center of the housing 20, similar to the first entry port 21 and the first exit port 22.

In addition, the high-temperature fluid ports 21, 22 may be disposed in the first stage of the rotor 40, and the low-temperature fluid ports 23, 24 may be disposed in the second stage of the rotor 40. As described below, the rotor 40 may be stacked in two stages, and the high-temperature fluid ports 21,22 and the low-temperature fluid ports 23, 24 may be disposed in each of the two stacked stages.

The fluid connection port 30 may include a first connection port 31 connected to a first outlet port 112 of the first heat exchanger portion 110, a second connection port 32 connected to a first inlet port 114 of the first heat exchanger portion 110, a third connection port 33 connected to a second outlet port 122 of the second heat exchanger portion 120, and a fourth connection port 34 connected to a second inlet port 124 of the second heat exchanger portion 120.

The fluid connection port 30 is connected to the first heat exchanger portion 110 and the second heat exchanger portion 120 as described above to allow the fluid to flow. Here, the second connection port 32 and the third connection port 33 may be disposed in the first stage of the rotor 40 and the first connection port 31 and the fourth connection port 34 may be disposed in the second stage of the rotor 40, but their disposition is not limited thereto. They may be disposed at other locations.

Meanwhile, a transport port 36 is provided on the outer surface of the housing 20 to connect the fluid channels disposed in the first stage and the second stage of the rotor 40 to each other to allow transport from one stage to the other stage. The transport port 36 may use pipes with curved fluid path connecting the first stage and the second stage of the rotor 40. Two transport ports 36 may be disposed along the outer circumferential surface of the housing 20, and four fluid connection ports 30 may be disposed between them respectively. In other words, a total of 12 ports may be sequentially disposed on the outer surface of the housing 20: four fluid connection ports 30, transport port 36, four fluid connection port 30, and transport port 36.

The first entry port 21 may be disposed in a straight flow path to the second connection port 32, the first exit port 22 may be disposed in a straight flow path to the third connection port 33, the second entry port 23 may be disposed in a straight flow path to the fourth connection port 34, and the second exit port 24 may be disposed in a straight flow path to the first connection port 31.

FIGS. 3 to 5 show that the rotor 40 may be formed in a cylindrical shape to be accommodated inside the housing 20. The rotor 40 is provided with a rotor shaft 42 and is coupled to the drive shaft. As a result, when the actuator 10 is driven, the rotor receives power through the drive shaft and rotates at a predetermined angle to control the opening and closing of the valve.

The rotor 40 is stacked in two stages along the axial direction in the present embodiment. To this end, the rotor 40 may be assembled from a first rotor portion 44, a second rotor portion 45, and a third rotor portion 46. This is an illustrative example. The rotor 40 may be integrally formed in one piece. Assembling the rotor 40 from three configurations has the advantage of facilitating the machining of a plurality of fluid channels in the rotor 40.

A plurality of fluid channels selectively communicating with the high-temperature fluid ports 21,22, low-temperature fluid ports 23, 24, fluid connection port 30, and transport port 36 according to the rotation may be formed in the rotor 40. A plurality of fluid channels may be disposed in each of the two stages.

A 1-1 channel 50, a 1-2 channel 54 forming a path to cross the 1-1 channel 50, and a 1-3 channel 56 forming a path to cross the 1-1 channel 50 may be formed in the first stage (the stage side away from the actuator 10) of the rotor 40.

The 1-1 channel 50 may be formed inside a first tube 52 passing through the outer circumferential surface of the rotor 40. The 1-2 channel 54 and the 1-3 channel 56 may be formed to cross the 1-1 channel 50 perpendicularly or may be formed along the outside of the space the first tube 52 passes through.

More specifically, the 1-2 channel 54 and the 1-3 channel 56 may be formed larger than the space that the first tube 52 passes through such that fluid may flow over the top surface of the first tube 52. In other words, the 1-2 channel 54 and the 1-3 channel 56 may form a space vertically larger than the first tube 52 such that fluid may flow through this space.

The 1-2 channel 54 and the 1-3 channel 56 may be disposed side by side in a direction perpendicular to the first tube 52, and the flow path formed in the 1-2 channel 54 and the 1-3 channel 56 may be formed in a curved shape having a predetermined curvature. In addition, the 1-2 channel 54 and the 1-3 channel 56 may be formed with both ends in the shape of an elongated hole to create a space vertically larger than the first tube 52 as described above. In other words, the 1-2 channel 54 and the 1-3 channel 56 should be formed to have a circular cross-section in the absence of the first tube 52 but, with the first tube 52 passing through in the middle, have a vertically elongated cross-section to avoid interference.

A 2-1 channel 60, a 2-2 channel 64 forming a flow path to cross the 2-1 channel 60, and a 2-3 channel 66 forming a flow path to cross the 2-1 channel 60 may be formed in the second stage (the stage side close to the actuator 10) of the rotor 40.

The 2-1 channel 60 may be formed inside a second tube 62 passing through the outer circumferential surface of the rotor 40. The 2-2 channel 64 and the 2-3 channel 66 may be formed to cross the 2-1 channel 60 perpendicularly and may be formed along the outside of the space the second tube 62 passes through.

More specifically, the 2-2 channel 64 and the 2-3 channel 66 may be formed larger than the space the second tube 62 passes through such that fluid may flow over the top surface of the second tube 62. In other words, the 2-2 channel 64 and the 2-3 channel 66 may form a space vertically larger than the second tube 62 such that fluid may flow through this space.

The 2-2 channel 64 and the 2-3 channel 66 may be disposed side by side in a direction perpendicular to the second tube 62, and the flow path formed in the 2-2 channel 64 and the 2-3 channel 66 may be formed in a curved shape having a predetermined curvature. In addition, the 2-2 channel 64 and the 2-3 channel 66 may be formed with both ends in the shape of an elongated hole to create a space vertically larger than the second tube 62, as described above.

The 2-1 channel 60, the 2-2 channel 64, and the 2-3 channel 66 disposed in the second stage of the rotor 40 described above may be disposed at a predetermined angle relative to the 1-1 channel 50, the 1-2 channel 54, and the 1-3 channel 56 disposed in the first stage. For example, the 2-1 channel 60, the 2-2 channel 64, and the 2-3 channel 66 disposed in the second stage of the rotor 40 may be disposed at a 60° angle in the clockwise direction relative to the 1-1 channel 50, the 1-2 channel 54, and the 1-3 channel 56 disposed in the first stage.

The fluid channels described above are formed in the first rotor portion 44, the second rotor portion 45, and the third rotor portion 46 which make up the rotor 40. By machining fluid channels on the upper and lower surfaces of the second rotor portion 45, the fluid channels are formed in cooperation with the first rotor portion 44 and the third rotor portion 46.

The cooling mode, heating mode, and dehumidification mode of an automotive air-conditioning system according to an embodiment of the present invention will be described with reference to FIGS. 6 to 8 below.

Figure 6:
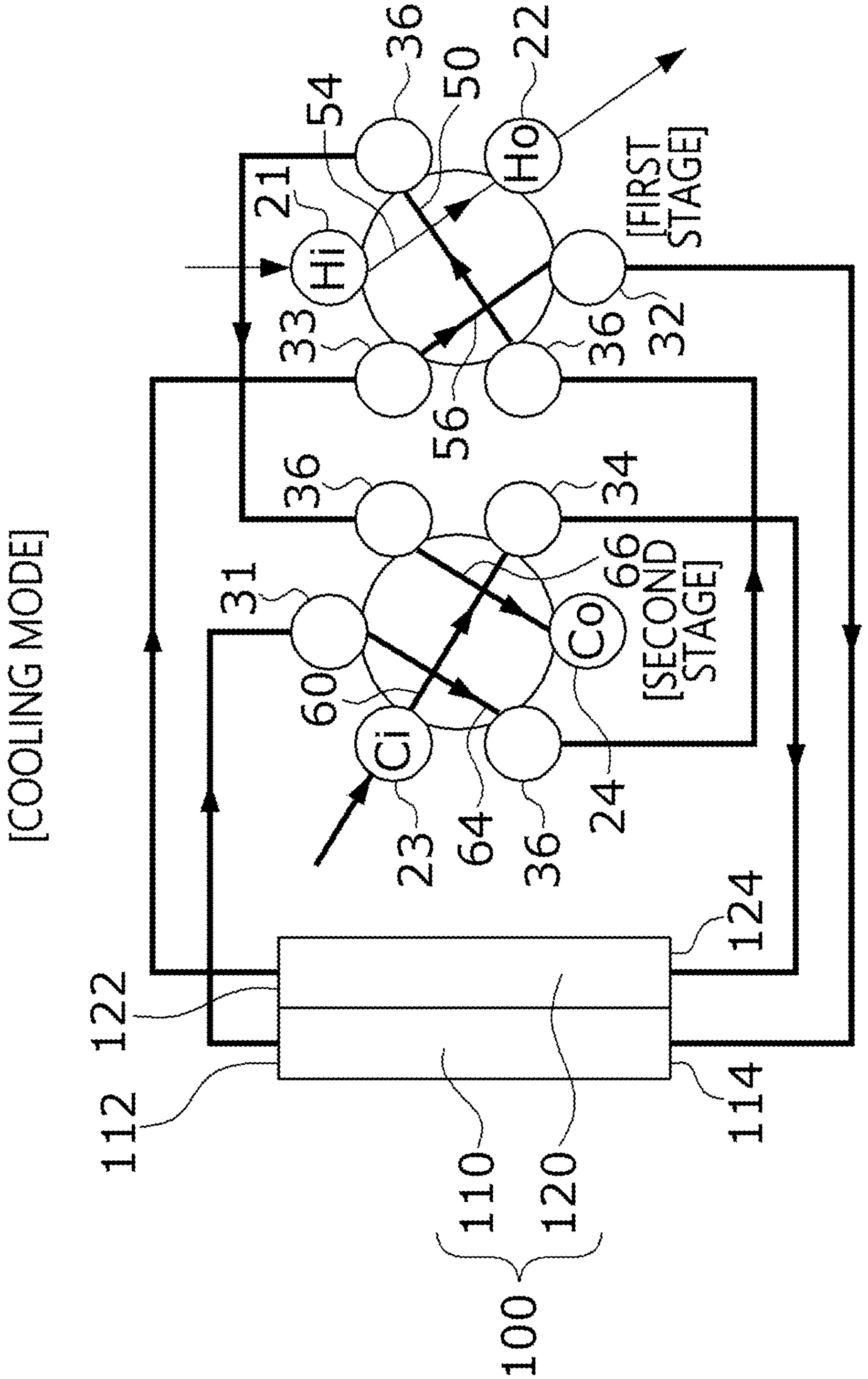
FIG. 6 is a view illustrating fluid flow during cooling mode using a fluid-controlling valve assembly according to an embodiment of the present invention.

FIG. 6 is a view illustrating fluid flow during a cooling mode using a fluid-controlling valve assembly according to an embodiment of the present invention.

This shows that the heat exchanger 100 disposed in the air condition unit (HVAC) needs to distribute cold coolant to the two of the first heat exchanger portion 110 and the second heat exchanger portion 120 during cooling mode. The first heat exchanger portion 110 may be disposed at the front of the heat exchanger 100, and the second heat exchanger portion 120 may be disposed at the rear of the heat exchanger 100.

The cold coolant enters the second entry port 23. The coolant entering the second entry port 23 exits through the fourth connection port 34 to enter the second inlet port 124 of the second heat exchanger portion 120. The cold coolant exchanges heat with the air in the second heat exchanger portion 120 so that cold air is blown into the vehicle cabin.

The coolant exiting the second outlet port 122 of the second heat exchanger portion 120 enters the third connection port 33 to exit the second connection port 32. The coolant exiting the second connection port 32 enters the first inlet port 114 of the first heat exchanger portion 110. The cold coolant exchanges heat with the air in the first heat exchanger portion 110 so that the cold air is blown into the vehicle chamber.

The fluid exiting the first outlet port 112 of the first heat exchanger portion 110 enters the first connection port 31. The coolant (positioned in the second stage) entering the first connection port 31 passes through the 2-2 channel 64 and then enters the 1-1 channel 50 positioned in the first stage through the transport port 36. The coolant exiting the 1-1 channel 50 enters the 2-3 channel 66 positioned in the second stage through the transport port 36 again to exit the second exit port 24.

Meanwhile, the hot coolant is controlled to enter the first entry port 21 instead of entering the heat exchanger 100 side and then exit the first exit port 22 during cooling mode.

Figure 7:
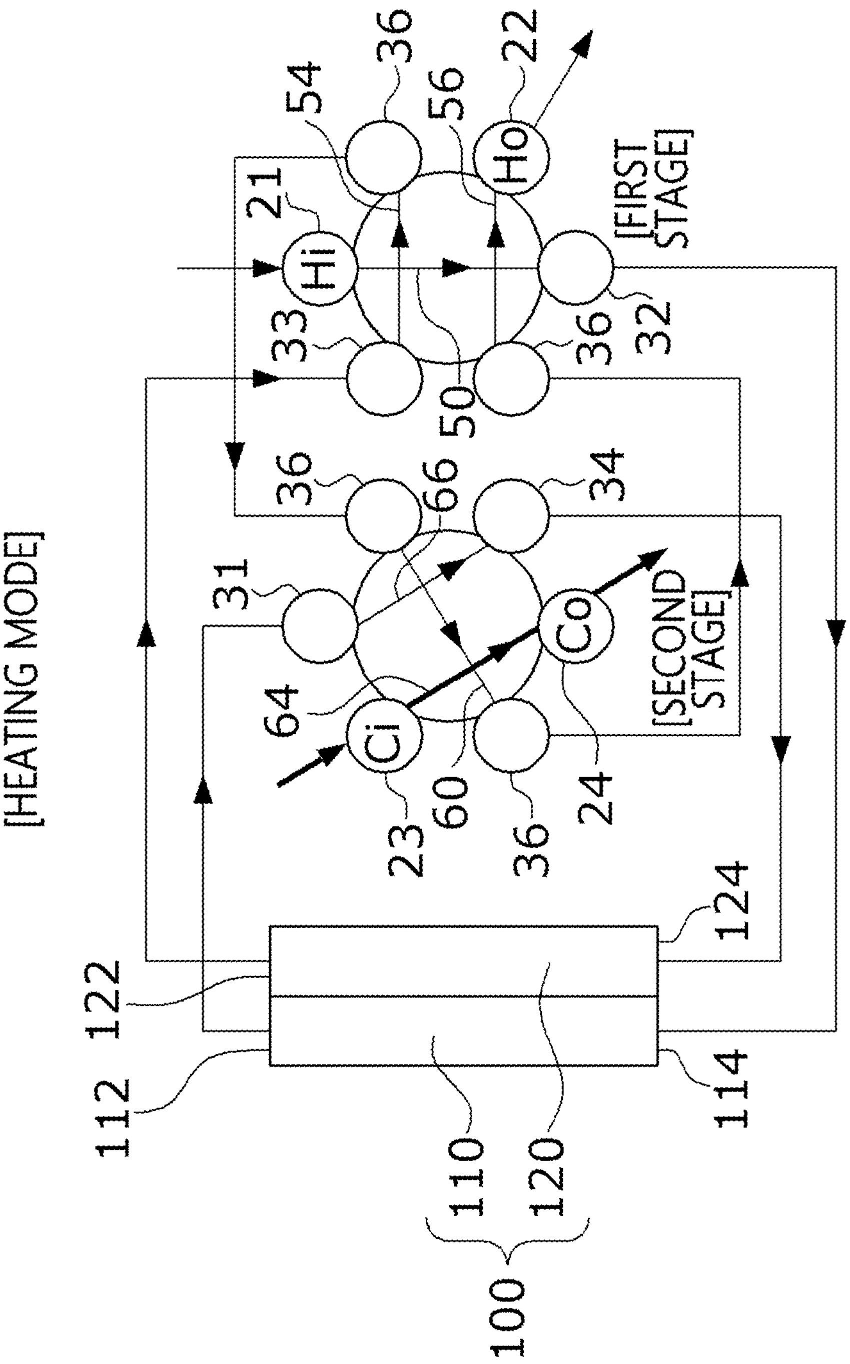
FIG. 7 is a view illustrating fluid flow during heating mode using a fluid-controlling valve assembly according to an embodiment of the present invention.

FIG. 7 is a view illustrating fluid flow during heating mode using a fluid-controlling valve assembly according to an embodiment of the present invention.

This shows that the cooling mode may be entered by rotating the rotor 40 clockwise by 60°. The hot coolant enters the first entry port 21. The coolant entering the first entry port 21 exits through the second connection port 22 to enter the first inlet port 114 of the first heat exchanger portion 110. The hot coolant exchanges heat with the air in the first heat exchanger portion 110 so that hot air is blown into the vehicle cabin.

The coolant exiting the first outlet portion 112 of the first heat exchanger portion 110 enters the first connection portion 31 to exit the fourth connection port 34. The coolant exiting through the fourth connection portion 34 enters the second inlet port 124 of the second heat exchanger portion 120. The hot coolant exchanges heat with the air in the second heat exchanger portion 120 so that hot air is blown into the vehicle cabin.

The coolant exiting the second outlet port 122 of the second heat exchanger portion 120 enters the third connection port 33. The coolant (positioned in the first stage) entering the third connection port 33 passes through the 1-2 channel 54 and then enters the 2-1 channel 60 positioned in the second stage through the transport port 36. The coolant exiting the 2-1 channel 60 enters the 1-3 channel 56 positioned in the first stage through the transport port 36 again to exit the first exit port 22.

Meanwhile, the cold coolant is controlled to enter the second entry port 23 instead of entering the heat exchanger 100 side and then exit the second exit port 24 during cooling mode.

Figure 8:
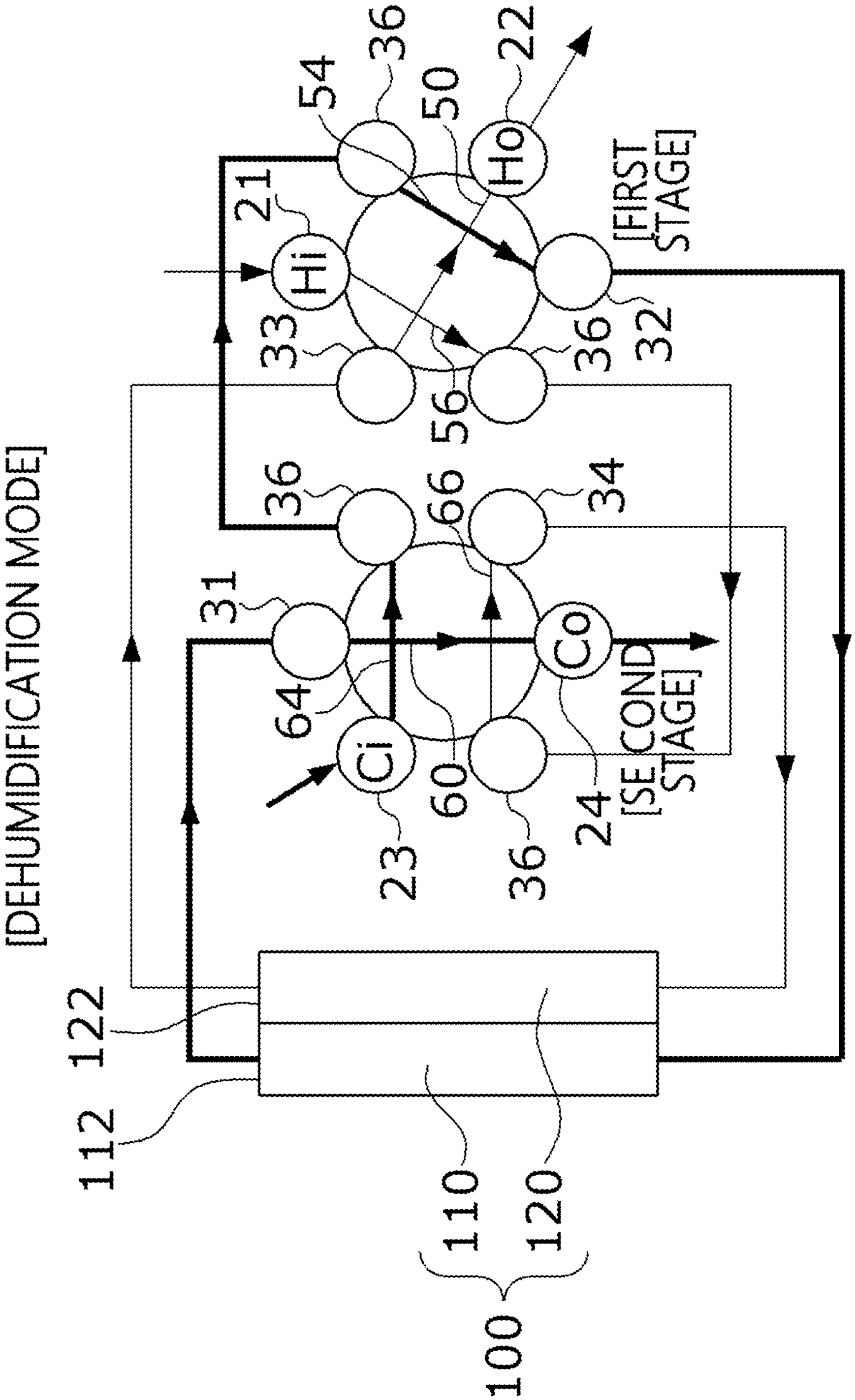
FIG. 8 is a view illustrating fluid flow during dehumidification mode using a fluid-controlling valve assembly according to an embodiment of the present invention.

FIG. 8 is a view illustrating fluid flow during dehumidification mode using a fluid-controlling valve assembly according to an embodiment of the present invention.

This shows that dehumidification mode may be entered by rotating the rotor 40 clockwise by 60° in cooling mode. The hot coolant enters the first entry port 21, passes through the 1-3 channel 56, and then enters the 2-3 channel 66 positioned in the second stage through the transport port 36. The coolant passing through the 2-3 channel 66 exits the fourth connection port 34.

The coolant exiting the fourth connection port 34 enters the second inlet port 124 of the second heat exchanger portion 120. The coolant exchanges heat with the air in the second heat exchanger portion 120 so that the dehumidified air is reheated.

The coolant exiting the second outlet port 122 of the second heat exchanger portion 120 enters the third connection port 33, passes through the 1-1 channel 50, and then exits the first exit port 22.

The cold coolant enters the second entry port 23. The coolant passes through the 2-2 channel 64 and then enters the 1-2 channel 54 positioned in the first stage through the transport port 36. The coolant passing through the 1-2 channel 54 exits the second connection port 32.

The coolant exiting the second connection port 32 enters the first inlet port 114 of the first heat exchanger portion 110. The cold coolant flows through the first heat exchanger portion 110 to remove humidity.

The coolant exiting the first outlet port 112 of the first heat exchanger portion 110 enters the first connection port 31, passes through the 2-1 channel 60, and then exits the second exit port 24.

According to an embodiment of the present invention as described above, forming channels in the rotor and configuring a plurality of ports communicating with the channels in the housing allow control of the heat exchanger in accordance with the air-conditioning mode using a single-valve assembly, thereby reducing costs and offering an advantage in packaging. In addition, a separate thermostatic door for the air-conditioning mode control of the heat exchanger is not required to implement cooling, heating, and dehumidification modes.

The present invention is described with reference to specific embodiments above. Still, it will be clearly understood by those skilled in the art that the present invention may be modified and changed in various ways within the scope not deviating from the ideas and scope of the present invention as described in the following patent claims.

DESCRIPTION OF REFERENCE NUMERALS

10: actuator 20: housing
21: first entry port 22: first exit port
23: second entry port 24: second exit port
30: fluid connection port 31: first connection port
32: second connection port 33: third connection port
34: fourth connection port 36: transport port
40: rotor 42: rotor shaft
44: first rotor portion 45: second rotor portion
46: third rotor portion 50: 1-1 channel
52: first tube 54: 1-2 channel
56: 1-3 channel 60: 2-1 channel
62: second tube 64: 2-2 channel
66: 2-3 channel 100: heat exchanger
110: first heat exchanger portion 112: first outlet port
114: first inlet port 120: second heat exchanger portion
122: second outlet port 124: second inlet port

The invention claimed is:

1. A fluid-controlling valve assembly, comprising:
a housing; and
a rotor disposed in the housing and rotatable in accordance with air-conditioning modes, the rotor including a first stage and a second stage stacked along an axial direction of the rotor, the rotor defining fluid channels to allow fluid to flow in each of the first stage and the second stage,
wherein the fluid-controlling valve assembly is configured to control the fluid to enter and exit an integrated heat exchanger having a first heat exchanger portion and a second heat exchanger portion,
wherein the housing includes high-temperature fluid ports configured to allow high-temperature fluid to enter and exit, low-temperature fluid ports configured to allow low-temperature fluid to enter and exit, and a plurality of fluid connection ports configured to be connected to the first heat exchanger portion and the second heat exchanger portion for fluid flow,
wherein the fluid channels are configured to selectively communicate with the high-temperature fluid ports, the low-temperature fluid ports, and the plurality of fluid connection ports according to rotation of the rotor,
wherein the plurality of fluid connection ports further includes a transport port to transport fluid from one of the first stage and the second stage to another of the first stage and the second stage of the rotor,
wherein the transport port connects the fluid channels to each other, and
wherein the high-temperature fluid has a temperature higher than a temperature of the low-temperature fluid.

2. The fluid-controlling valve assembly of claim 1,
wherein the high-temperature fluid ports include a first entry port configured to allow high-temperature fluid to enter and a first exit port configured to allow high-temperature fluid to exit, and
wherein the low-temperature fluid ports include a second entry port configured to allow low-temperature fluid to enter and a second exit port configured to allow low-temperature fluid to exit.

3. The fluid-controlling valve assembly of claim 2,
wherein the plurality of fluid connection ports comprise:
a first connection port configured to be connected to a first outlet port of the first heat exchanger portion;
a second connection port configured to be connected to a first inlet port of the first heat exchanger portion;
a third connection port configured to be connected to a second outlet port of the second heat exchanger portion; and
a fourth connection port configured to be connected to a second inlet port of the second heat exchanger portion.

4. The fluid-controlling valve assembly of claim 3, wherein the high-temperature fluid ports are disposed at a position corresponding to the first stage of the rotor, and the low-temperature fluid ports are disposed at a position corresponding to the second stage of the rotor.

5. The fluid-controlling valve assembly of claim 3, wherein the fluid channels comprise:

a 1-1 channel in the first stage of the rotor;

a 1-2 channel defining a flow path to cross the 1-1 channel in the first stage of the rotor;

a 1-3 channel defining another flow path to cross the 1-1 channel in the first stage of the rotor;

a 2-1 channel in the second stage of the rotor;

a 2-2 channel defining a flow path to cross the 2-1 channel in the second stage of the rotor; and a 2-3 channel defining another flow path to cross the 2-1 channel in the second stage of the rotor.

6. The fluid-controlling valve assembly of claim 5, wherein the 2-1 channel, the 2-2 channel, and the 2-3 channel are disposed at a 60° angle in a clockwise direction relative to the 1-1 channel, the 1-2 channel, and the 1-3 channel.

7. The fluid-controlling valve assembly of claim 6, wherein the 1-1 channel is defined inside a first tube passing through an outer circumferential surface of the rotor and the 2-1 channel is defined inside a second tube passing through the outer circumferential surface of the rotor.

8. The fluid-controlling valve assembly of claim 7, wherein the 1-2 channel and the 1-3 channel cross the 1-1 channel perpendicularly and are defined along an outside of a space that the first tube passes through, and wherein the 2-2 channel and the 2-3 channel cross the 2-1 channel perpendicularly and are defined along an outside of a space that the second tube passes through.

9. The fluid-controlling valve assembly of claim 7, wherein each of the 1-2 channel and 1-3 channel forms the flow path in a curved shape with both ends in a shape of an elongated hole, and wherein each of the 2-2 channel and the 2-3 channel forms the flow path in a curved shape with both ends in a shape of an elongated hole.

10. The fluid-controlling valve assembly of claim 6, wherein the fluid-controlling valve assembly is configured such that, during a cooling mode, the low-temperature fluid enters the second entry port and enters the second inlet port through the fourth connection port to exchange heat with air in the second heat exchanger portion, and the low-temperature fluid exiting the second outlet port of the second heat exchanger portion enters the third connection port to exit the second connection port and enters the first inlet port to exchange heat with air in the first heat exchanger portion.

11. The fluid-controlling valve assembly of claim 10, wherein the fluid-controlling valve assembly is configured such that, during the cooling mode, the low-temperature fluid exiting the first outlet port of the first heat exchanger portion enters the first connection port, passes through the 2-2 channel, and then enters the 1-1 channel through the transport port, and the low-temperature fluid exiting the 1-1 channel enters the 2-3 channel through the transport port and then exits the second exit port.

12. The fluid-controlling valve assembly of claim 6, wherein the fluid-controlling valve assembly is configured such that, during a heating mode, the high-temperature fluid enters the first entry port and enters the first inlet port through the second connection port to exchange heat with air in the first heat exchanger portion, and the high-temperature fluid exiting the first outlet port enters the first connection port to exit the fourth connection port and enters the second inlet port to exchange heat with air in the second heat exchanger portion.

13. The fluid-controlling valve assembly of claim 12, wherein the fluid-controlling valve assembly is configured such that, during the heating mode, the high-temperature fluid exiting the second outlet port enters the third connection port, passes through the 1-2 channel, and then enters the 2-1 channel through the transport port, and the high-temperature fluid exiting the 2-1 channel enters the 1-3 channel through the transport port and then exits the first exit port.

14. The fluid-controlling valve assembly of claim 6, wherein the fluid-controlling valve assembly is configured such that, during a dehumidification mode, the high-temperature fluid enters the first entry port, passes through the 1-3 channel, and then enters the 2-3 channel through the transport port, and the high-temperature fluid entering the 2-3 channel exits the fourth connection port to reheat air in the second heat exchanger portion.

15. The fluid-controlling valve assembly of claim 14, wherein the fluid-controlling valve assembly is configured such that, during the dehumidification mode, the high-temperature fluid exiting the second outlet port enters the third connection port, passes through the 1-1 channel, and then exits the first exit port.

16. The fluid-controlling valve assembly of claim 14, wherein the fluid-controlling valve assembly is configured such that, during the dehumidification mode, the low-temperature fluid enters the second entry port, passe through the 2-2 channel, and then enters the 1-2 channel through the transport port, and the low-temperature fluid entering the 1-2 channel exits the second connection port to remove humidity in the first heat exchanger portion.

17. The fluid-controlling valve assembly of claim 16, wherein the fluid-controlling valve assembly is configured such that, during the dehumidification mode, the low-temperature fluid exiting the first outlet port enters the first connection port, passes through the 2-1 channel, and then exits the second exit port.

18. The fluid-controlling valve assembly of claim 1, wherein the transport port is a pipe connecting a first stage side and a second stage side of the rotor on an outer surface of the housing.

* * * * *